Aug. 12, 1969  MORIO ONOE ET AL  3,461,408

ORIENTED $LiTaO_3$ CRYSTAL AND DEVICES USING SAME

Original Filed Oct. 11, 1966

INVENTORS M. ONOE
A. W. WARNER, JR.

BY George S. Indig

ATTORNEY

United States Patent Office 3,461,408
Patented Aug. 12, 1969

3,461,408
ORIENTED LiTaO₃ CRYSTAL AND DEVICES USING SAME
Morio Onoe, Tokyo, Japan, and Arthur W. Warner, Jr., Whippany, N.J., assignors to Bell Telephone Laboratories, Incorporated, Murray Hill, N.J., a corporation of New York
Continuation of application Ser. No. 585,978, Oct. 11, 1966. This application Feb. 9, 1967, Ser. No. 614,916
Int. Cl. H01v 7/02
U.S. Cl. 333—72                                    7 Claims

ABSTRACT OF THE DISCLOSURE

Plates of the piezoelectric material LiTaO₃, which may be represented as 165° y plates, evidence pure mode thickness shear vibration and high coupling efficiency. Such rotated cut crystals are particularly useful as piezoelectric transducers used to convert between electromagnetic and elastic wave energy. Devices utilizing such plates are described.

CROSS REFERENCE TO RELATED APPLICATIONS

This application is a continuation of United States application Ser. No. 585,978, filed Oct. 11, 1966.

BACKGROUND OF INVENTION

Field of invention.—This invention relates to oriented single crystals of lithium tantalate (LiTaO₃) and to elastic wave devices incorporating such crystals. The invention relies on the discovery that a particular orientation results both in pure shear mode and in high coupling efficiency.

Description of the prior art.—Lithium tantalate, first disclosed as a ferroelectric material in 76 Physical Review 1886 (Dec. 15, 1949), has more recently been studied for its piezoelectric and elastic wave properties. The composition has attracted considerable interest for such use due to reported coupling coefficients of 40 percent or greater and unusually high elastic Q values over a frequency range extending well into the megahertz. See 48 Journal of the American Ceramic Society 112 (1965). Of course, the composition is known to have other desirable properties for device use, such as physical and chemical stability, and to be amenable to growth in large, essentially perfect sections by pulling.

Summary.—An exhaustive study has now been conducted on the lithium tantalate system, and it has been determined that there is one critical orientation which results in an optimization of the transducer properties. For this orientation there is essentially but one shear mode excited, this mode having a coupling coefficient of the order of 45 percent. The second shear mode and the extensional mode are both reduced to a level not readily detected by ordinary techniques, so that they may be assumed to be 30 db below the excited mode. Equally important is the fact that the predominant mode is pure. It is readily apparent that use of this orientation in a transducer assures efficient conversion between elastic energy and electromagnetic energy, as well as a virtual absence of spurious vibrations.

In accordance with this invention it has been determined that use of a particular orientation of LiTaO₃ results in an optimization of the transducer properties of this material. Crystal sections of this invention take the form of plates which, in accordance with certain standardized engineering practice, may be designated as rotated y plates with a clockwise rotation of from 8–12° about the x-axis from the xz plane. The basis for this designation is discussed in detail below. A preferred embodiment of the invention makes use of such a plate in a transducer which has electrodes affixed to the crystal in such fashion as to take advantage of the pure mode and high coupling efficiency described. Of course, the specified advantages are realized in cuts which closely approximate the orientation, and such approximations are intended to be within the inventive scope. For these purposes, designation of any crystalline plane is meant to include deviations as great as ±5° in any direction.

LiTaO₃ is a trigonal crystal of the space grouping R3c. For convenience, it is popular practice to describe the system as being hexagonal and as having three mirror planes rather than three glide planes parallel to the optic axis. The engineering notation ("Standards on Piezoelectric Crystals," from the Proceedings of the IRE, volume 37, No. 12 [December 1949]) relies on the designation of the optic axis as the z-axis and on the a-axis (any of the three axes normal to the optic axis and also normal to the mirror planes) as the x-axis. The remaining axis, the y-axis, is merely designated as normal to both the x- and z-axes. Where suitable, it is common to refer to an orientation which does not correspond with any of the planes defined by any pair of the three axes as being rotated from the plane most closely approximating the desired orientation. The orientation of the present invention is close to a y plate, that is a plate which is on the plane normal to the y-axis or, in other words, in the plane of the xz-axes. Starting from the position of this y plate, the present orientation may be regarded as being rotated about 10° clockwise about the x-axis. Such a plate may be designated as a 165° y plate. Since the permissible orientation range for these purposes is defined as 165°±5°, the plate of the invention is hereinafter designated the 165°±5° y plate, however always allowing for the permissible ±5° deviation as described. In device applications, an electric field is imposed across the short dimension of the plate, so that electrodes are ordinarily affixed to the broad faces of the section.

BRIEF DESCRIPTION OF THE INVENTION

A detailed description of the invention is expedited by reference to the figure, in which.

DETAILED DESCRIPTION OF THE INVENTION

Figure 1:
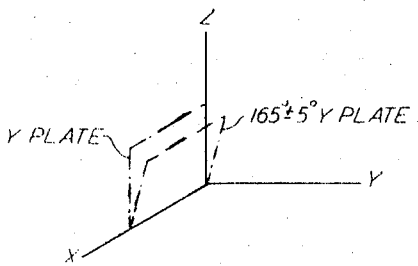
FIG. 1 is a diagrammatic representation of the inventive orientation.

Referring again to FIG. 1, the assumptions made in designating the oriented crystal have been discussed. The figure illustrates the 10°±5° rotation about the x-axis from the y plate position to the inventive 165°±5° y plate position.

Figure 2:
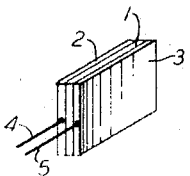
FIG. 2 is a perspective view of a crystal section together with affixed electrodes in accordance with the invention.

In FIG. 2, a 165°±5° y plate 1 of LiTaO₃ is provided with electrodes 2 and 3, which may be deposited, plated, etc., in accordance with any suitable technique. Such electrodes may cover the broad crystal faces as shown or may be of lesser area, for example, to minimize unwanted coupling. Electrical connection to the electrodes is made by means of leads 4 and 5. The transducer of this figure may serve as a resonator, for example performing the function of a filter or frequency standard, or it may be part of a larger device such as a delay line.

Figure 3:
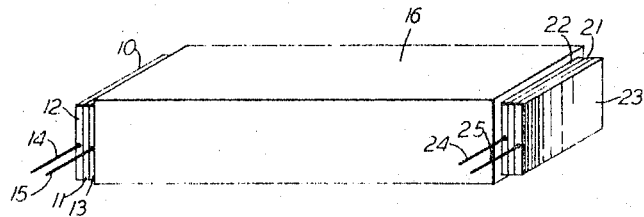
FIG. 3 is a perspective view of a device incorporating a transducer such as that of FIG. 2.

The device of FIG. 3 is a conventional delay line incorporating a transducer 10 which, like the device of FIG. 2, is made up of a 165°±5° y plate 11 of LiTaO₃, together with its associated electrodes 12 and 13, to which electrical connection is made by means of leads 14 and 15 connected to signal source not shown. The elastic wave produced by the electrical signal is then launched in the acoustic medium 16, which may be made of silica, glass, metal, or any other suitable material. For certain uses, it is desirable to use $LiTaO_3$ for this member also, it having been observed that this material shows unusually low loss particularly for frequencies above a megahertz. Upon reaching the end of acoustic member 16, the elastic wave is reconverted into an electromagnetic signal in rotated y plate 21, and this signal is detected by means of circuitry including electrodes 22 and 23, together with wire leads 24 and 25.

It should be stressed that the angle of rotation specified is critical. For rotation substantially above 175°, the extensional mode reaches measurable proportions. For rotations substantially below 165°, the coupling efficiency decreases noticeably, and the mode of vibration departs from pure mode. The rotation designated is also a near optimum in that the frequency spacing between resonance and anti-resonance is large, so permitting a greater operating frequency range. Many other orientations have been studied. Some of these have reasonable values of coupling efficiency in the extensional mode or in a shear mode, some show a suitably predominant mode, some manifest pure mode of vibration, but none combine all three.

The preferred orientation has been consistently described as applied to a plate structure, and it is this configuration that is of concern in most transducer structures. For these purposes, a plate is generally about a half wavelength thick, for the center frequency that is of the order of millimeters or less. The large dimensions are generally determined on the basis of good device design, such as desired and/or permitted electrode resistance, capacitance, etc. It is resonable to assume that transducer plates have large dimensions, at least five times the thickness dimension. More generally, however, the eleastic wave propagation which results when an electrical field is produced in the crystallographic direction corresponding with the thickness direction in the 165°±5° y plate results in the advantages noted regardless of the crystal thickness. Accordingly, mode separation, together with good efficiency and broad frequency operating range, results in a cut body of any thickness dimension so long as the electrodes are placed on faces of the orientation specified by the 165°±5° y plate, or so long as the corresponding shear mode is propagated by any means.

The invention has been described very briefly in terms of a small number of embodiments. The composition itself and acceptable techniques for preparing the composition are sufficiently well known so that detailed discussion is unnecessary. Fundamentally, the invention depends upon the finding that the particular orientation described results in an optimization of the properties disclosed. Minor modifications made in the composition, due either to accidental inclusions or responsive to a desire to alter properties such as temperature dependence, conductivity, absorption, growth, etc., do not alter the inventive finding. Accordingly, the preferred orientation is considered to apply so long as at least 99 percent by weight of the composition is $LiTaO_3$. Similarly, representation of the vast family of suitable transducer structures by the small number of examples set forth is not intended to limit the invention.

While the devices described have utilized crystal sections having two plane parallel surfaces each corresponding with the rotated orientation of the invention, other structures known to those skilled in the art may advantageously utilize the noted orientation. For example, it is common in the resonator art to contour one or both of the major faces so as to restrict the motion to a desired portion of the plate. This has been accomplished by tapering the surface of one or both faces away from the plateau or, in the extreme, by use of one or two convex surfaces. Still another approach, sometimes referred to as mode trapping, utilizes thickened electrodes affixed only to the desired portion of the plate. The effect of this configuration is to restrict the motion to that portion of the crystal lying between electrodes. Accordingly, to benefit from the inventive teaching it is necessary only that those surface portions of the major faces associated with the motion be oriented as specified. The annexed claims are to be so construed.

What is claimed is:
1. Single crystal body consisting essentially of $LiTaO_3$, such body having two parallel plane surface portions which are rotated 165°±5° from the plane approximately corresponding with the y plane.
2. Body of claim 1 in which the dimension normal to the said surfaces is of a maximum length equal to one-fifth the length of the smaller dimension defining the said surfaces.
3. Body of claim 2, together with means for producing an electrical field between the said surfaces.
4. Body of claim 3 in which the said means comprises a metal electrode associated with each surface.
5. Body of claim 4 in which the said electrodes cover a major portion of the said surfaces.
6. Device comprising the body of claim 2, together with an acoustic medium, said medium being so arranged relative to the said body that an elastic wave in the body is launched in the medium.
7. Device of claim 6 additionally including a 165°±5° y plate of $LiTaO_3$ at the terminus of the said acoustic medium, so arranged that an elastic wave launched within the said media is converted to electromagnetic wave energy in the said plate.

References Cited

UNITED STATES PATENTS

| | | | |
|---|---|---|---|
| 2,484,635 | 10/1949 | Mason | 310—9.5 |
| 2,743,144 | 4/1956 | Bottom et al. | 310—9.5 |
| 2,925,502 | 2/1960 | Franz | 310—9.5 |
| 3,375,379 | 3/1968 | Royer | 310—9.5 |

HERMAN K. SAALBACH, Primary Examiner

T. J. VEZEAU, Assistant Examiner

U.S. Cl. X.R.

310—9

UNITED STATES PATENT OFFICE
CERTIFICATE OF CORRECTION

Patent No. 3,461,408                              August 12, 1969

Morio Onoe et al.

It is certified that error appears in the above identified patent and that said Letters Patent are hereby corrected as shown below:

Column 1, line 68, cancel "of from 8-12°". Column 2, line 29, cancel "about 10°"; line 54, cancel "10° ± 5°". Column 3, line 13, "175°" should read -- the maximum indicated --; line 15, "165°" should read -- the minimum indicated --.

Signed and sealed this 28th day of April 1970.

(SEAL)
Attest:

Edward M. Fletcher, Jr.
Attesting Officer

WILLIAM E. SCHUYLER, JR.
Commissioner of Patents